United States Patent Office 2,795,512
Patented June 11, 1957

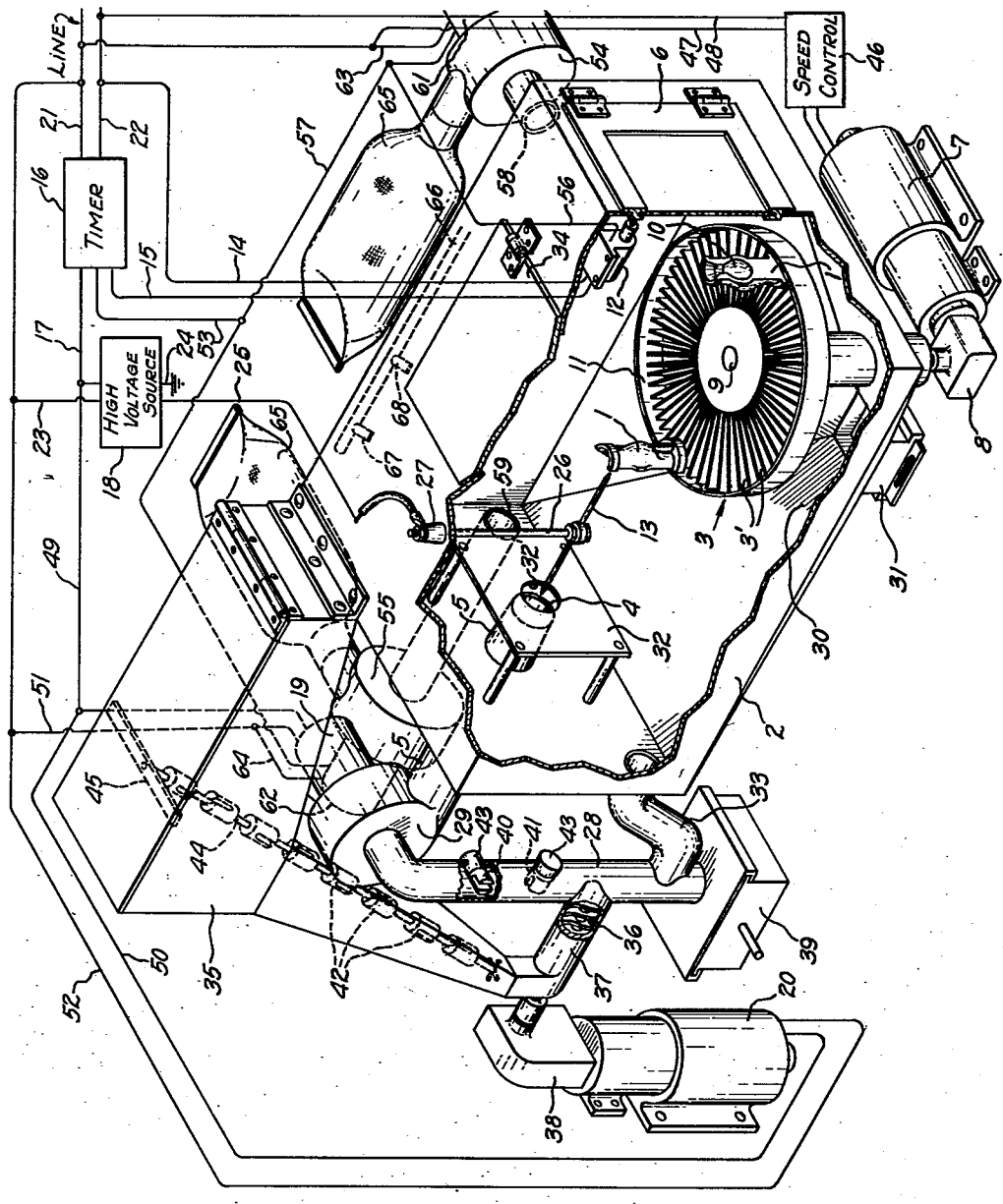

2,795,512

ELECTROSTATIC METHOD AND APPARATUS FOR LINING MOLDS

George W. Sherratt, Shaker Heights, and Clarence E. Hahn, Euclid, Ohio, assignors to General Electric Company, a corporation of New York Application August 28, 1953, Serial No. 377,016

5 Claims. (Cl. 117—5.3)

This invention relates to methods and apparatus for forming refractory linings on metal molds for glass working and more particularly to the electrostatic deposition of materials suited to be burned to a refractory form upon the cavities of glass working molds.

Lined molds, of the type referred to, are generally termed paste molds and have been lined either by the application of a lining paste or by immersing adhesive-coated molds in finely ground lining material. Each of these methods must be performed with the utmost care to make a mold lining of uniform character and thickness, and prevent any irregularities or imperfections therein. It is well understood that any variation in the lining of a mold will produce a corresponding variation in glass articles blown therein. Any unevenness in the surface lining of the mold will, for instance, produce a blemish in the glass article formed by the mold, whereas any unevenness in the character or thickness will produce striations in the article and retard the flow of glass within the mold to such an extent that said article is of nonuniform thickness.

One object of the invention is to apply a lining to the cavity of a metal mold for glass working by electrostatic means suited to the deposition of particles of the lining material in a coating of uniform character.

Another object of the invention is to provide for the application of a uniform deposition of a mean size of ground cork particles over the surface of a cavity in a glass working mold.

Another object of the invention is to provide a noncritical and economical manner of readily applying to a number of metal glass working molds, coatings of particles adapted to form refractory linings for said molds.

Another object of the invention is to provide apparatus for automatically applying by electrostatic deposition a uniform coating of mean size particles upon the surface of cavities of glass working molds.

Still other objects of the invention will appear from the following detailed description of a species thereof and from the drawing.

The drawing is a perspective view of electrostatic coating apparatus comprising the invention, the enclosure of said apparatus being broken away to show the mold supporting and particle deposition means therein, and the electrical means of said apparatus being shown in diagrammatic form.

The method and apparatus of the present invention provides for air-entrained particles of ground cork, cotton flock, aluminum oxide, ceramics and other mold coating materials to be deposited in a uniform manner over the surfaces of the cavities of glass working molds of the type commonly referred to as paste molds and used in forming blown articles such as lamp bulbs. The coating materials are preferably deposited over an adhesive (usually boiled linseed oil) on the molds and are applied while said molds are located within an enclosure capable of controlling and, at the same time, preventing the loss of free coating particles to the atmosphere. The molds 1 (of which two are shown) are located within the enclosure 2 of the mold coating apparatus appearing in the drawing and are arranged about the periphery of a turntable 3 which rotates to present them in succession at a coating position opposite the mouth 4 of the particle discharging tube 5. This manner of operation limits the coating operation in any one cycle to the molds 1 carried by the turntable 3 and necessitates idle periods at intervals in the operation of the apparatus to permit the molds 1 to be loaded and unloaded from said turntable 3.

The cycle of operation starts with the molds 1 being loaded upon the turntable 3 by an operator stationed opposite the door 6 at the end of the enclosure 2. The normal constant rotation of the turntable 3, effected through the operation of the electric motor 7 and speed reducer 8 in engagement with the supporting shaft 9, slowly presents succeeding portions thereof opposite the door 6. Usually a group of molds 1 is loaded upon the turntable 3 at one time, said group representing some of the molds 1 used in a high-speed lamp bulb blowing machine and being, accordingly, of the same size and form. The molds 1 are rested upon the thin ribs 3' of the turntable 3 with the faces containing the cavities 10 bearing against the upstanding rim 11 thereof and are normally arranged as close together as possible so that the maximum number of molds can be coated in each cycle of operation of the apparatus. When the molds 1 have been loaded, the operator seals the enclosure 2 by closing the door 6 which automatically starts the coating functions of the apparatus since the door 6 then bears against and trips the main control switch 12.

The coating functions of the apparatus are dependent both upon particles of the mold coating materials being carried to the mold 1 at the coating position in a stream of air discharged from tube 5 and the electrostatic forces of a high voltage source connected between the mold support turntable 3 and the electrode 13 in the path of the air stream. Both the air stream and the electrostatic field are created at the same time by the actuation of the main control switch 12 when the door 6 is closed and, because of their interlock with the door 6, prevent the coating material from being blown out into the open air and prevent accidental shock and possible injury to the operator of the apparatus.

The control switch 12 is connected by the leads 14 and 15 to one side of the line (or source of current) and the timer 16, respectively, and starts the cycle of operation by completing a circuit to the timer 16. The function of the timer 16, in turn, is to connect the lead 17 to the high voltage source 18 and to the air-blowing and coating-material-feeding motors 19 and 20, respectively. The timer 16, which is in operative condition at all times because of the connections 21 and 22 to the line, limits the operating interval of the high voltage source 18, and the air-blowing and the coating-material-feeding motors 19 and 20, respectively, to one or more revolutions of the turntable 3 so that the apparatus can be operated without manual attention.

The high voltage source 18 also maintains a permanent connection to the line through the conductor 23 and has its high potential output connected through lead 24 to the ground and through lead 25 to the support rod 26 for the electrode 13. In the instance shown in the drawing where finely ground cork is the coating material, it has been determined that an electrostatic source 18 providing a potential in the order of about 8,500 to 11,000 volts effects the deposition of uniformly arranged cork particles in a satisfactory layer over the cavities 10 of the bulb forming molds 1. During the deposition of the cork particles, the turntable 3, which is mounted upon the upper end of shaft 9, is turned constantly at a rate of one revolution per minute by the electric motor 7 and speed reducer 8, the latter being connected to the lower end of the shaft 9. The cork particles are charged oppositely from the grounded side of the electrostatic source 18 and are attracted to the molds 1 inasmuch as the enclosure 2 is also grounded and said molds 1 maintain electrical contact with the turntable 3. The electrode 13 is insulated from the enclosure 2 by an insulator 27 in the top of said enclosure 2. It has also been determined that best results occur when the cavity 10 of the mold 1 is cleaned of worn linings and foreign matter and that the degree of cleanliness required can be achieved by boiling said mold 1 in a detergent solution for a time.

The coating material, in this instance cork particles, is introduced into the air stream in a vertical section 28 of the air supply system at a point below the centrifugal blower 29 attached to the motor 19 and is fed into the air stream at a rate considerably in excess of the rate said particles deposit upon the molds 1. Normal or mean size cork particles and inordinately fine cork particles within the air stream take a charge from the electrode 13 during their passage in the immediate vicinity thereof and are carried toward the mold cavity 10 both by the currents of the air stream and the opposite charge of the mold 1. However, the excessively fine cork particles, which do not have the momentum of the mean size particles, do not ordinarily deposit upon the molds 1 but remain in suspension within the enclosure 2. The majority of the excess mean size particles, on the other hand, fall onto the funnel-shaped bottom 30 of the enclosure 2 which directs them to a central collecting pocket 31. The sloping bottom 30 of the enclosure 2 also catches any cork particles which settle over the turntable 3 and fall through the spaces between the ribs 3' thereof. Further control over the deposition of the cork particles is afforded by spacing the end of the electrode 13 slightly more than one inch away from the faces of said molds 1 and by locating the opposite end of said electrode 13 approximately in the center of the opening 32' in a grounded orifice plate 32 spaced about one inch from the mouth 4 of the air tube 5. The orifice plate 32 is particularly desirable, because it presents a very thin edge opposite the end of the electrode 13 and accordingly cannot retain any appreciable build-up of particles that move back through the air stream after being charged by the electrode 13. The position of the orifice plate 32 is also of advantage since all turbulent air emerging from the tube 5 strikes the back of the plate 32 and does not pass to the molds 1.

A closed circuit air supply is provided since it allows the use of the low-pressure, low-velocity air system required to effect the rejection of off-size and foreign particles from the coating supply and since it is desirable to prevent leakage of air-borne cork particles from the interior of the enclosure 2. The closed circuit air supply system pulls air from said enclosure 2 through the tube 33, which is connected between the back corner of the enclosure 2 and a lower portion of the vertical section 28 of the supply tube system. A safety feature is provided in the unlatched door 34 over an opening in the top of the enclosure 2, which door 34 is free to swing open to relieve any pressure built up in case of an explosion within said enclosure 2.

The ground cork particles appearing in the air supply stream are fed from a main supply contained within the hopper 35 associated with the air supply system, and are fed automatically from the lower end of said hopper 35 to the vertical section 28 of the air supply system by the feed screw 36 within the housing 37. The manner of feeding the cork particles is such that the proper amount is introduced into the vertical tube section 28 by the normal rotation of said feed screw 36 produced by the interconnected electric motor 20 and the speed reducer 38. This combination of means also assists in effecting the rejection of abnormally large particles of ground cork, earth particles, sand and other heavy foreign material that may have become mixed with the main supply thereof because the large particles and heavy foreign material do not become air-borne in the air stream within the vertical supply tube section 28 and finally drop into the container 39 at the lower end of said tube section 28. The cork particles and other material collecting in the container 39 of the air circulating means are usually discarded; whereas the cork particles collected in the pocket 31 are usually salvable and are normally returned to the hopper 35.

The selective nature of the coating apparatus is still further enhanced by the presence of two magnets 40 and 41 in the vertical section 28 of the air supply system and a series of magnets 42 in the hopper 35. The attraction of the magnets 40, 41 and 42 for metal rids the coating material of fine metal pieces which are, for some unknown reason, present in ground cork and which are very apt to provide blemish producing points in the lining of a mold 1. The magnets 40 and 41, which are of general U-form, are mounted upon rubber corks 43 forced into openings in the tube section 28 at right angles to each other and are arranged with poles thereof in the center portion of the passage through said tube section 28. The magnets 42, which are also of the general U form, are mounted in pairs along a brass rod 44 adapted to hang down in the center portion of the hopper 35 and can be removed from the hopper 35 for cleaning simply by lifting out the rod 44 and the cross bar 45 which rests in notches in the top edge of the hopper 35. A more thorough cleaning of the main ground cork supply is effected by manually moving the rod 44 and magnets 42 throughout the interior of the hopper 35 on occasion.

The coating cycle relating to the molds 1 located upon the turntable 3 normally comprises one rotation of the turntable 3 and, accordingly, one passage through the air stream at a point opposite the electrode 13. Different size molds will require some variation in their speed of movement to permit the proper quantity of coating material to be deposited thereon and conventional regulation means 46 are provided in the leads 47 and 48 between the motor 7 and the line for varying the speed of rotation of the motor 7 and, correspondingly, of the turntable 3 to permit the speed of movement of the mold 1 to be adjusted as desired. Adjustment of the speed of rotation of the turntable 3 is not required, however, during the application of coating materials to any one load of molds 1 on the turntable 3. The timer 16 automatically breaks the circuit between leads 15 and 17 when the turntable 3 has completed one revolution so that current no longer flows to the high voltage source 18 through the lead 17 and through leads 49 and 50 to the motors 19 and 20. The leads 51 and 52 are permanent connections between the motors 19 and 20 and the opposite side of the line.

The operation of the timer 16 also initiates the next step in the operation of the apparatus in that it makes a circuit between the leads 15 and 53 at the same time it breaks the circuit between leads 15 and 17 and thereby causes the two suction fans 54 and 55 to exhaust the particle laden atmosphere from the enclosure 2. After an interval suitable to the clearance of the atmosphere within the enclosure 2, the operator opens the door 6 to the enclosure to gain access to the molds 1. This operation separates the door 6 from the control button of the switch 12 with the result that the circuit through lead 15 to the timer 16 is interrupted and an alternate circuit from lead 14 to the two suction fans 54 and 55 through leads 56 and 57 is made causing continued operation of the fans 54 and 55. The switch 12, through its control of the circuit between leads 14 and 15, provides an interlock control which prevents the feeding of cork particles and which disconnects the high voltage source 18 should the door 6 be opened at any time during the cycle of operation. The suction fans 54 and 55, which are located opposite openings 58 and 59 at corners of the enclosure 2, are caused to operate in both instances by the completion of a circuit from the lead 57 to the electric motors 61 and 62 in association with the suction fans 54 and 55, respectively. Permanent connections are maintained through the leads 63 and 51, 52 and 64 to the motors 61 and 62, respectively. The suction fans 54 and 55 discharge the cloud of very fine particles of cork withdrawn with the atmosphere into cloth bags 65 and function both as a means of removing a displeasing and possibly explosive condition and of removing the very fine particles not desired in the coatings for molds 1.

It is normally preferred that the molds 1 be removed from the enclosure 2 to a tray (not shown), where they are allowed to remain for a few minutes, and that the coating within the cavities 10 therein then be burned to the proper form for use. This last step is usually performed by first baking the molds 1 in an oven to fix the adhesive and then rubbing hot glass about the cavity 10 to surface condition the lining. The interval of time occurring between the removal of the molds 1 from the coating apparatus and the burning of the coating permits the electrostatic charge to leak from the particles and causes those particles not held by the adhesive to lose their attraction for the molds 1 and for the most part drop free therefrom. The excessive thickness of coating particles located over the mold cavities are released at such times; however, all of this particular excess may not fall free of the molds until the cavities have been burned and are cleaned by air jets. These operations complete the formation of the mold linings and result in linings having the uniform porosity desired of paste-type molds. Such linings are produced by the selective nature of the apparatus which provides for the deposition of only mean size particles over the mold cavities and the electrostatic manner of effecting the deposition which arranges the particles uniformly over the mold cavity. It should be noted in this connection that paste mold linings must retain moisture during their use in glass blowing apparatus in order to form a superheated steam cushion between the mold and the blown article, which cushion will prevent the formation of mold marks.

The apparatus can again be loaded with another set of molds 1 and then be started through another cycle of operation simply by closing the door 6. It is usually desirable, however, to return the electrode 13 to full effectiveness after each operation as some particles may have settled thereon. This last operation is performed by blowing jets of air across the electrode 13 and is performed by momentarily opening a valve (not shown) in the air line 66 in the inside upper corner of the enclosure 2, so that air streams are discharged from the nozzles 67 and 68 therealong.

While we have described an application of the invention, we do not wish to be limited to the exact details shown as it will be understood that many modifications of the precise manner by which the invention is carried into effect as well as the apparatus in which it is used may be made without departing from the scope of the appended claims.

What we claim as new and desire to secure by Letters Patent of the United States is:

1. Apparatus for applying lining material of mean size dry particles to the cavity of a metal mold from a mass of mean size and off-size dry particles comprising an enclosure, means for supporting a mold at a coating position in the enclosure, a hopper for a mass of mean size and off-size dry particles, means including a discharge tube having a mouth opening into said enclosure for entraining particles from said hopper in an air stream directed toward the coating position and the cavity of a mold, a thin metal orifice plate mounted in alignment with and adjacent the mouth of said discharge tube and between said mouth and the mold support means, said mold support means being spaced from the mouth of said discharge tube a distance effective for air separation of said particles, electrode means mounted at the opening in said orifice plate and adjacent said mold coating position, and means connected between the mold supporting means and the orifice plate on the one hand and the electrode means on the other hand for producing a high electrical potential difference therebetween to cause electrostatic separation and deposition of entrained particles at said plate and deposition of entrained particles in the cavity of a supported mold.

2. Apparatus for applying lining material of mean size dry particles to the cavity of a metal mold from a mass of mean size and off-size dry particles comprising an enclosure, means for supporting a mold at a coating position in the enclosure, a hopper for a mass of mean size and off-size dry particles, means including a discharge tube having a mouth opening into said enclosure for entraining particles from said hopper in an air stream directed toward the coating position and the cavity of a mold, a thin metal orifice plate mounted in alignment with and adjacent the mouth of said discharge tube and between said mouth and the mold support means, said mold support means being spaced from the mouth of said discharge tube a distance effective for air separation of said particles, an elongated electrode pointed at each end mounted in said enclosure with one end thereof at the center of the opening in said orifice plate and with the opposite end thereof adjacent the mold coating position and means connected between the mold supporting means and the orifice plate on the one hand and the elongated electrode on the other hand for producing a high electrical potential difference therebetween to cause electrostatic separation and deposition of entrained particles at said orifice plate and deposition of entrained particles in the cavity of a supported mold.

3. Apparatus for applying mean size dry particles to a metal mold from a mass of mean size and off-size dry particles comprising an enclosure, means for supporting a mold at a coating position in the enclosure, a hopper for said particles and means including a discharge tube having a mouth opening into said enclosure for entraining particles from said hopper in an air stream directed toward the mold coating position in said enclosure, the mouth of said discharge tube and said mold supporting means being spaced apart a distance effective for air separation of said particles, said apparatus comprising also electrostatic means in said enclosure at said mold supporting means to cause disposition of entrained particles on a supported mold and electrostatic means in said enclosure and upstream a sufficient distance from the electrostatic means at said mold support means to cause electrostatic separation thereat of entrained particles.

4. In the forming of paste linings on the cavities of glass working metal molds by applying an adhesive to the cavity of the mold, applying a layer of cork particles to the adhesive and thereafter fixing the adhesive and carbonizing the layer of cork particles by heat treatment, the method of applying to the adhesive on the mold cavity prior to the heat treatment a coating of mean size cork particles from a mass including mean size and off-size dry cork particles which comprises the step of entraining particles from said mass in an air stream directed toward the adhesive coated cavity of said mold to effect air separation of said particles while creating an electrostatic field upstream from said mold to effect electrostatic separation of entrained particles and while creating also an electrostatic field at said mold to cause deposition of entrained particles thereon.

5. The method of coating a metal mold with mean size dry particles from a mass including mean size and off-size dry particles which comprises the step of entraining particles from said mass in an air stream directed toward said mold to effect air separation of said particles while creating an electrostatic field upstream from said mold to effect electrostatic separation of entrained particles and while creating also an electrostatic field at said mold to cause deposition of entrained particles thereon.

References Cited in the file of this patent

UNITED STATES PATENTS

| | | |
|---|---|---|
| 1,474,009 | Straw | Nov. 13, 1923 |
| 1,512,344 | Lorang | Oct. 21, 1924 |
| 1,825,707 | Wagner | Oct. 6, 1931 |
| 1,855,869 | Pugh | Apr. 26, 1932 |
| 1,859,797 | Ready | May 24, 1932 |
| 2,089,138 | Stearns et al. | Aug. 3, 1937 |
| 2,128,327 | Russell et al. | Aug. 30, 1938 |
| 2,173,032 | Wintermute | Sept. 12, 1939 |
| 2,245,651 | Craig et al. | June 17, 1941 |
| 2,431,629 | Wind et al. | Nov. 25, 1947 |
| 2,433,116 | Greenbowe et al. | Dec. 23, 1947 |
| 2,528,087 | Schoppe | Oct. 31, 1950 |
| 2,529,291 | Graham | Nov. 7, 1950 |
| 2,538,562 | Gustin et al. | Jan. 16, 1951 |
| 2,546,701 | Ransburg et al. | Mar. 27, 1951 |
| 2,600,129 | Richards | June 10, 1952 |